(12) United States Patent
Coons et al.

(10) Patent No.: US 6,454,055 B1
(45) Date of Patent: Sep. 24, 2002

(54) BRAKING DEVICE WITH SHOE-ORIENTING COMPLIANT MEMBER

(75) Inventors: Todd Coons, Newington, CT (US); Elijah Garner, Davenport, IA (US); Larry L. Howell, Orem, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 09/763,818

(22) PCT Filed: Aug. 18, 1999

(86) PCT No.: PCT/US99/19057

§ 371 (c)(1),
(2), (4) Date: Jun. 1, 2001

(87) PCT Pub. No.: WO00/12377

PCT Pub. Date: Mar. 9, 2000

Related U.S. Application Data

(60) Provisional application No. 60/098,586, filed on Aug. 31, 1998.

(51) Int. Cl.⁷ .................................................. B62L 1/14
(52) U.S. Cl. .................. 188/24.22; 188/24.12
(58) Field of Search ............................. 188/24.11–24.22

(56) References Cited

U.S. PATENT DOCUMENTS

| 5,636,716 A | 6/1997 | Sugimoto et al. |
| 5,655,630 A | 8/1997 | Sugimoto |
| 5,775,466 A | 7/1998 | Banyas et al. |
| 5,913,387 A | 6/1999 | Kazuhisa et al. |
| 6,109,397 A | * 8/2000 | Chen ........................ 188/24.22 |

* cited by examiner

Primary Examiner—Christopher P. Schwartz
(74) Attorney, Agent, or Firm—Thorpe North & Western, LLP.

(57) ABSTRACT

A bicycle cantilever brake for being applied to a wheel rim of a bicycle. Specifically, there is a seat (7) fixedly mounted to the bicycle. There is a brake arm (2), rotatably mounted at a first end to the seat. There is also a brake shoe assembly, rotatably mounted to a mid-section of the brake arm. Uniquely, there is a flexible member (5), non-rotatably coupled to the seat and the brake shoe assembly, whereby the flexible member maintains an aligning axis (90) of the brake shoe assembly in a parallel orientation during successive stages of actuation.

22 Claims, 4 Drawing Sheets

BRAKING DEVICE WITH SHOE-ORIENTING COMPLIANT MEMBER

This application is a 371 of PCT/US99/19057, filed Aug. 18, 1999, which claims benefit of Provisional No. 60/098, 586, filed Aug. 31, 1998.

FIELD OF THE INVENTION

The present invention relates to a bicycle brake device and more particularly, to a bicycle brake device that is supported by fastening pins extending from the front fork or the rear fork of a bicycle, and that is driven by a brake cable for allowing the brake shoes to be pressed against the rim of the corresponding bicycle wheel.

PRIOR ART

Cantilever brakes, because of their strong brake power, are almost universally used on bicycles designed for off-road riding such as mountain bikes and all-terrain bikes. A cantilever brake device includes a left and a right brake arms having one end pivotally mounted on the fork of the bicycle frame, and a brake cable connected to the other end of the brake arms for actuating the brake arms to rotate in a closing direction when a bicyclist actuates a brake lever to pull the brake cable. Consequently, the brake shoes or pads that are installed on the intermediate portion of the brake arms include the braking surfaces facing the side surfaces of the bicycle wheel rim. The braking surfaces of the brake shoes may be pressed against the rim to produce braking action.

Examples of patents related to the present invention are as follows, and each patent is herein incorporated by reference for the supporting teachings:

U.S. Pat. No. 5.655,630, is a bicycle brake device.

U.S. Pat. No. 5,636,716, is a bicycle brake device.

U.S. Pat. No. 5,495.920, is a braking force adjusting apparatus for a bicycle.

Within the last decade or so, cantilever brakes with elongate arms, sometimes referred to as "v-shaped" brakes, have appeared on the market. These long-armed cantilever brakes provide a leverage, also known as mechanical advantage, over the traditional cantilever brakes. Specifically, the longer arms on these brakes result in a decreased ratio between the amount of finger pressure that a biker needs to apply to the brake lever and the amount of pressure consequently applied by the brake shoes to the wheel rim. This increased leverage is particularly desirable for long biking trips and downhill riding.

In 1996, Shimano, one of the largest bicycle manufacturers, introduced a new version of the V-brake into the market. The new version of the V-brake is a long-armed cantilever brake with a four-bar link mechanism that comprises four rigid links arranged as a parallelogram. When a bicyclist actuates the brake lever, the linkage pivots simultaneously with the brake arm for moving the brake shoe in a line of action normal to the side surface of the bicycle wheel rim. The flatly hitting of the brake shoes onto the wheel rim maximizes the braking power, and eliminates uneven pad wear, and eliminates the need to reposition pads as they wear down.

However, the four-bar link mechanism includes four links and their associated pin joints that complicate the brake manufacture and maintenance and that increase the cost of the brake device. The links also allow for "play" or jiggling between associated parts that bikers find particularly noticeable under heavy breaking conditions. Furthermore, the four-bar brake mechanism produces excessive squeal that has caused so many complaints that Shimano has had to produce a special kit designed to deal with the squeal. Also, this design requires a restoring force, like a spring, to return the brake assembly to the unengaged or non-braking position.

The present invention has arisen to mitigate and/or obviate the afore-described disadvantages of the conventional brake devices.

OBJECTS AND SUMMARY OF THE INVENTION

The primary objective of the present invention is to provide a brake device including a simplified compliant member for actuating the brake shoes to hit the wheel rim flatly.

In accordance with one aspect of the invention, there is provided a brake device for a bicycle, the brake device comprising a pair of brake arms each including a lower portion pivotally coupled to the bicycle at a pivot axle and each including a middle portion and an upper portion, the brake arms being caused to rotate about the pivot axle when the upper ends of the brake arms are forced toward each other, a pair of frames pivotally secured to the middle portions of the brake arms respectively at a pivot shaft, a pair of brake shoes attached to the frames respectively for acting onto a wheel rim of the bicycle when the upper ends of the brake arms are forced toward each other, a pair of seats secured on the pivot axles respectively, and a pair of compliant members each including a first end secured to the frame and a second end secured to the seat. The frames are caused to rotate relative to the brake arm about the pivot shaft respectively and to move the brake shoes to engage with the wheel rim in a horizontal attitude when the brake arm is rotated about the pivot axle.

A tube is secured on the pivot axle and includes at least one projection extended radially outward therefrom, the seat includes at least one notch formed therein for receiving the at least one projection of the tube and for securing the tube and the seat together.

An adjusting device is further provided for adjusting the compliant member relative to the seat and to adjust the frame and the brake shoe to rotate about the pivot shaft. The seat includes a protrusion having a screw hole formed therein, the adjusting device includes a screw threaded in the screw hole of the seat and engaged with the compliant member for moving and adjusting the compliant member relative to the seat when the screw is threaded relative to the protrusion of the seat.

The frames each include an extension extended therefrom, and the seats each include a bulge formed thereon. The first ends of the compliant members are secured to the extensions of the frames respectively and the second ends of the compliant members are secured to the bulges of the frames respectively.

Further objectives and advantages of the present invention will become apparent from a careful reading of a detailed description provided hereinbelow, with appropriate reference to accompanying drawings.

DETAILED DESCRIPTION OF THE INVENTION

Figure 1:
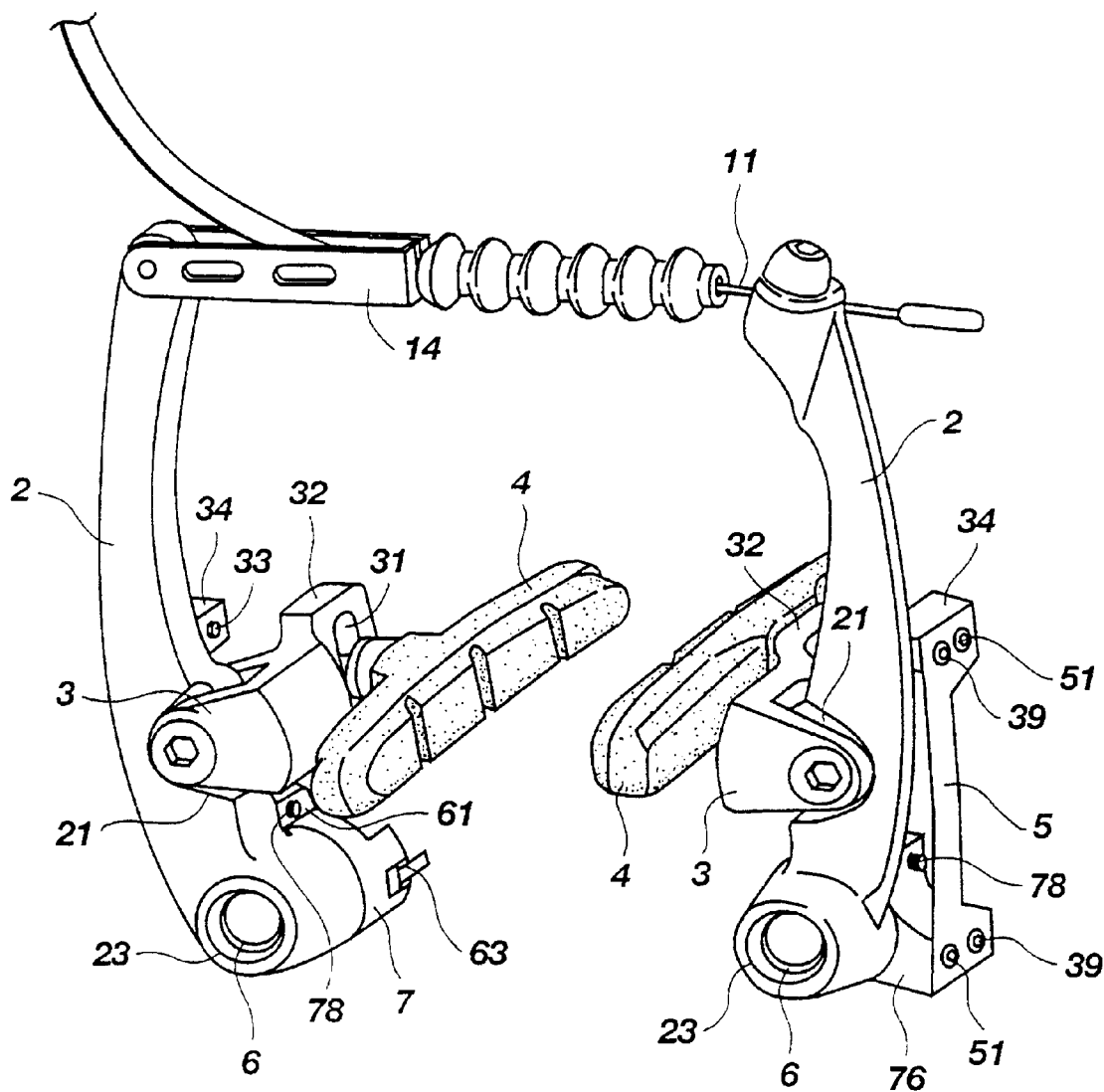
FIG. 1 is a perspective view of a brake device in accordance with the present invention.
Figure 2:
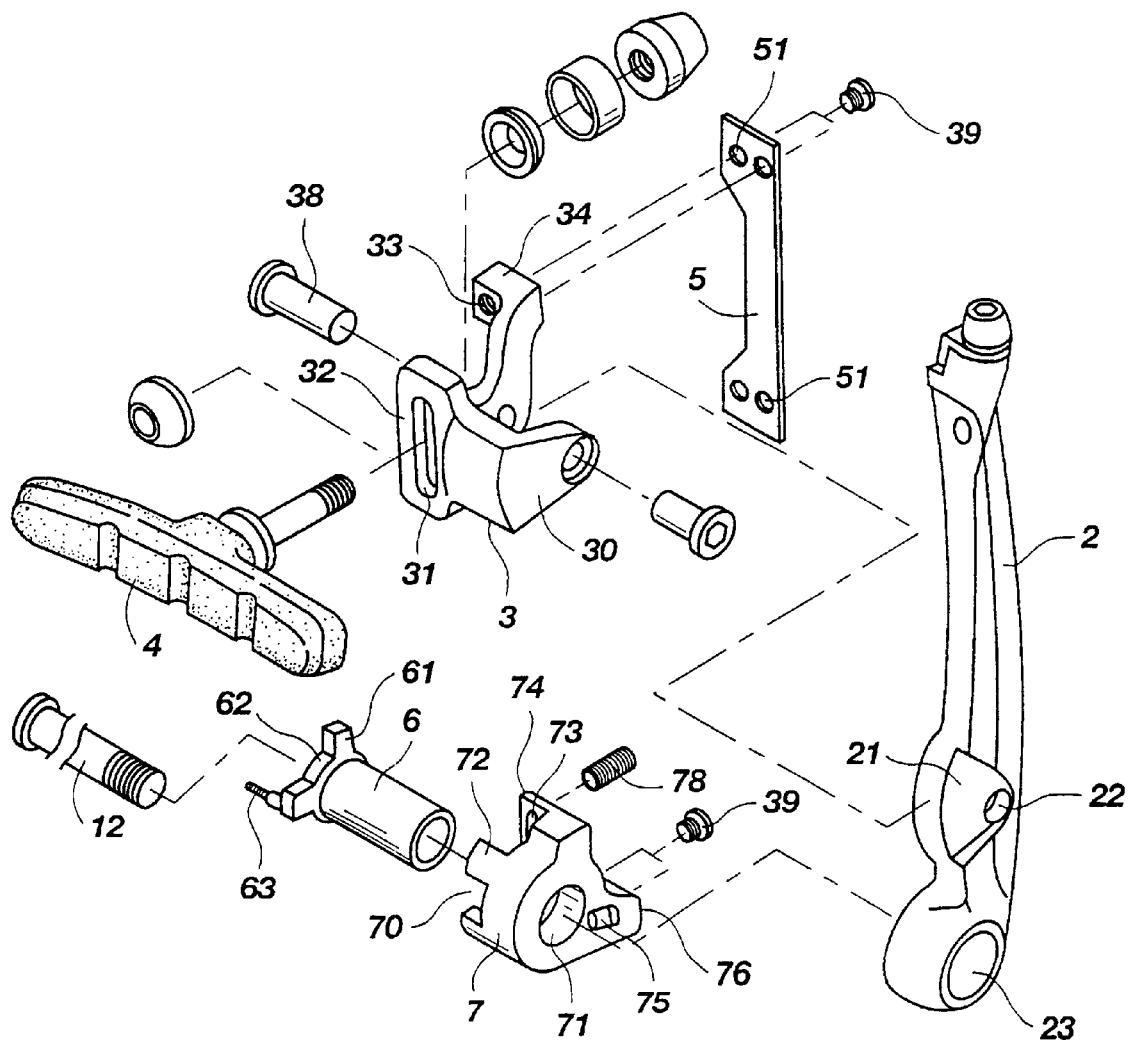
FIG. 2 is a partial exploded view of the brake device.
Figure 3:
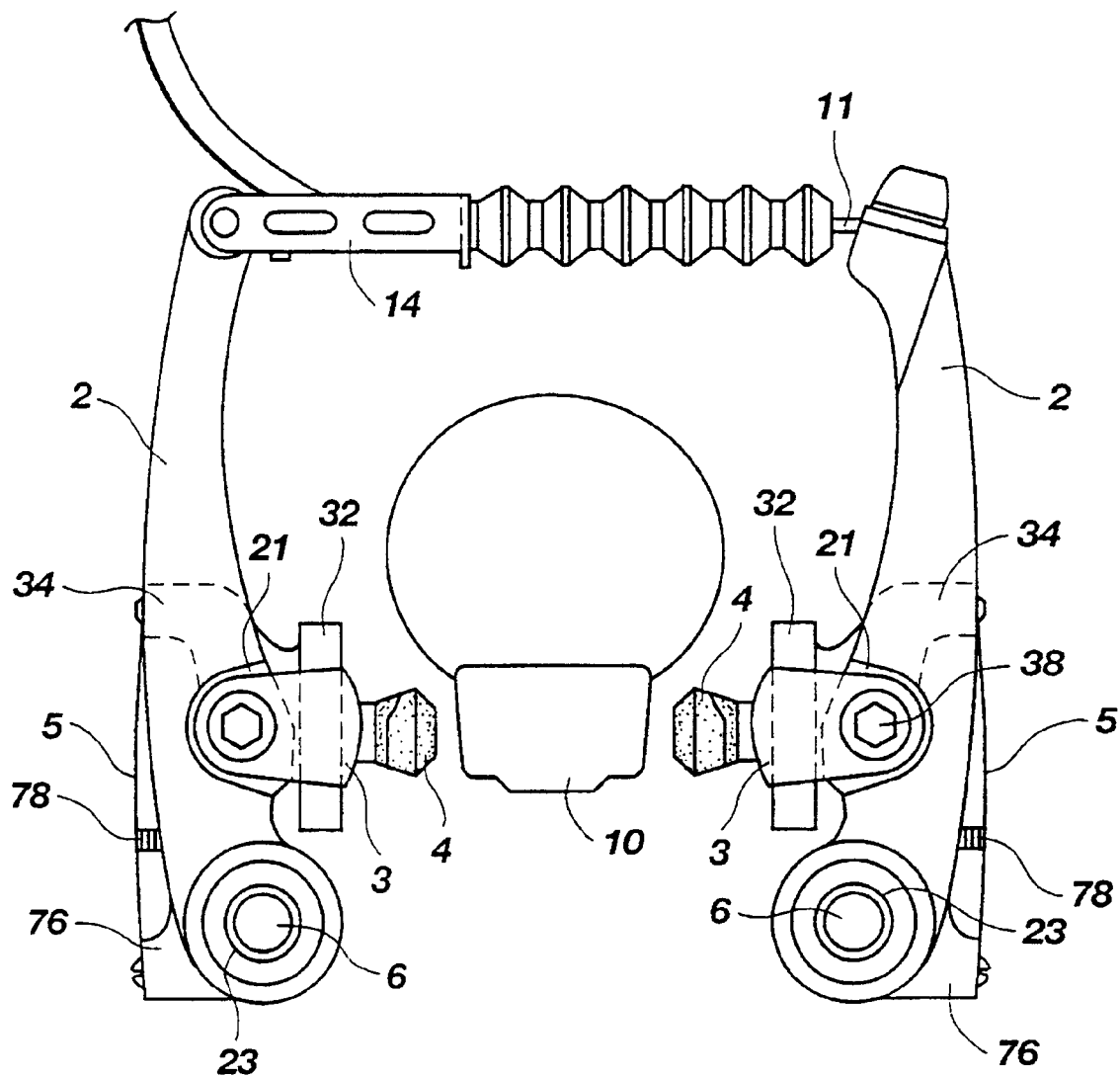
FIG. 3 is a plane view of the brake device.

Referring to the drawings, and initially to FIGS. 1–3, a brake device in accordance with the present invention is provided for attaching to the front fork or the rear fork of a bicycle and for pressing against the side surfaces of the wheel rim 10 (FIG. 3) of the bicycle. The brake device comprises a pair of brake arms 2 each including a lower portion pivotally coupled to the bicycle, particularly the fork members of the bicycle, by a fastener 12 (FIG. 2) or by attaching to a fastening pin that extends from the fork member of the bicycle. The fasteners 12 operate as the pivot axles of the brake arms 2 to the bicycle. The upper ends of the brake arms 2 are fastened to the inner wire and the outer wire of the brake cable 11 respectively. The gap between the brake shoes and the side surfaces of the wheel rim 10 may be adjusted by adjusting the relative position between the inner wire and the outer wire of the brake cable 11. The brake arms 2 each include an orifice 23 formed in the lower portion and each includes an aperture 22 and one or two opposite depressions 21 formed in the middle portion thereof.

The brake arms 2 are constructed so that they are generally symmetrical with respect to the left-right direction, and the intermediate parts of the brake arms are bent outward in a convex bow shape. Only one of the brake arms 2 and the members attached thereto will be discussed hereinafter.

A frame 3 is pivotally secured. to the middle portion of the brake arm 2 at a pivot shaft 38 and includes a pair of legs 30 received in the depressions 21 of the brake arm 2. The frame 3 is attached more or less horizontally to intermediate portions of the brake arm 2 and is symmetrical with respect to the left-right direction and includes a board 32 having an oblong hole 31 formed therein for adjustably securing a brake shoe 4 thereto. The frame 3 includes an extension 34 having one or more screw holes 33 formed therein for engaging with fasteners 39. A compliant member 5 has one or more holes 51 formed in each of its ends for engaging with the fasteners 39. One end of the compliant member 5 is secured to the extension 34 of the frame 3 by the fasteners 39. The compliant member 5 is a sheet-like member formed from a strong but flexible material, preferably titanium or polypropylene, that should be strong enough to withstand braking pressures but flexible enough to avoid creep.

A tube 6 is engaged on the fastener 12 and engaged through the orifice 23 of the brake arm 2 and includes an annular flange 62 formed on one end thereof and having one or more projections 61 extended radially outward therefrom. The tube 6 includes a pin 63 extended axially from one of the projections 61 of the tube 6. The pin 63 may be engaged into either one of a number of holes of the fork members of the bicycle for securing the tube 6 to the fork members and for allowing the tube 6 to be adjusted relative to the bicycle at any selected angular position. The tube 6 may also be secured in place by the fastener 12. A seat 7 includes a hole 71 formed therein for rotatably engaging on the tube 6 and includes one or more holes 75 formed in a bulge 76 thereof for engaging with the fasteners 39 which may secure the other end of the compliant member 5 to the seat 7. The seat 7 includes one or more notches 70 formed therein and defined by one or more bars 72 extended laterally from the seat 7 for allowing the tube 6 and the seat 7 to be moved in concert with each other and for allowing the tube 6 and the seat 7 to be secured to the lower end of the brake arm 2 relatively by the fastener 12. The seat 7 includes a protrusion 74 extended therefrom and having a screw hole 73 formed therein for threading with an adjusting screw 78.

As shown in FIGS. 1 and 3, the screws 78 are engaged with the compliant members 5 and may be threaded relative to the protrusion 74 of the seat 7 to adjust the angular position of the frame 3 and the brake-shoe 4 relative to the brake arm 2 by the compliant member 5. The lower portion of the brake arm 2 is rotatably secured to the seat 7 such that the rotational movement of the brake arm 2 about the pivot axle 12 will not be affected by the seat 7. The seat 7 is secured in place by the fastener 12 to the bicycle, such that the brake arm 2 can rotate relative to the seat 7 when the upper ends of the brake arms 2 are actuated by the brake cable.

Figure 4:
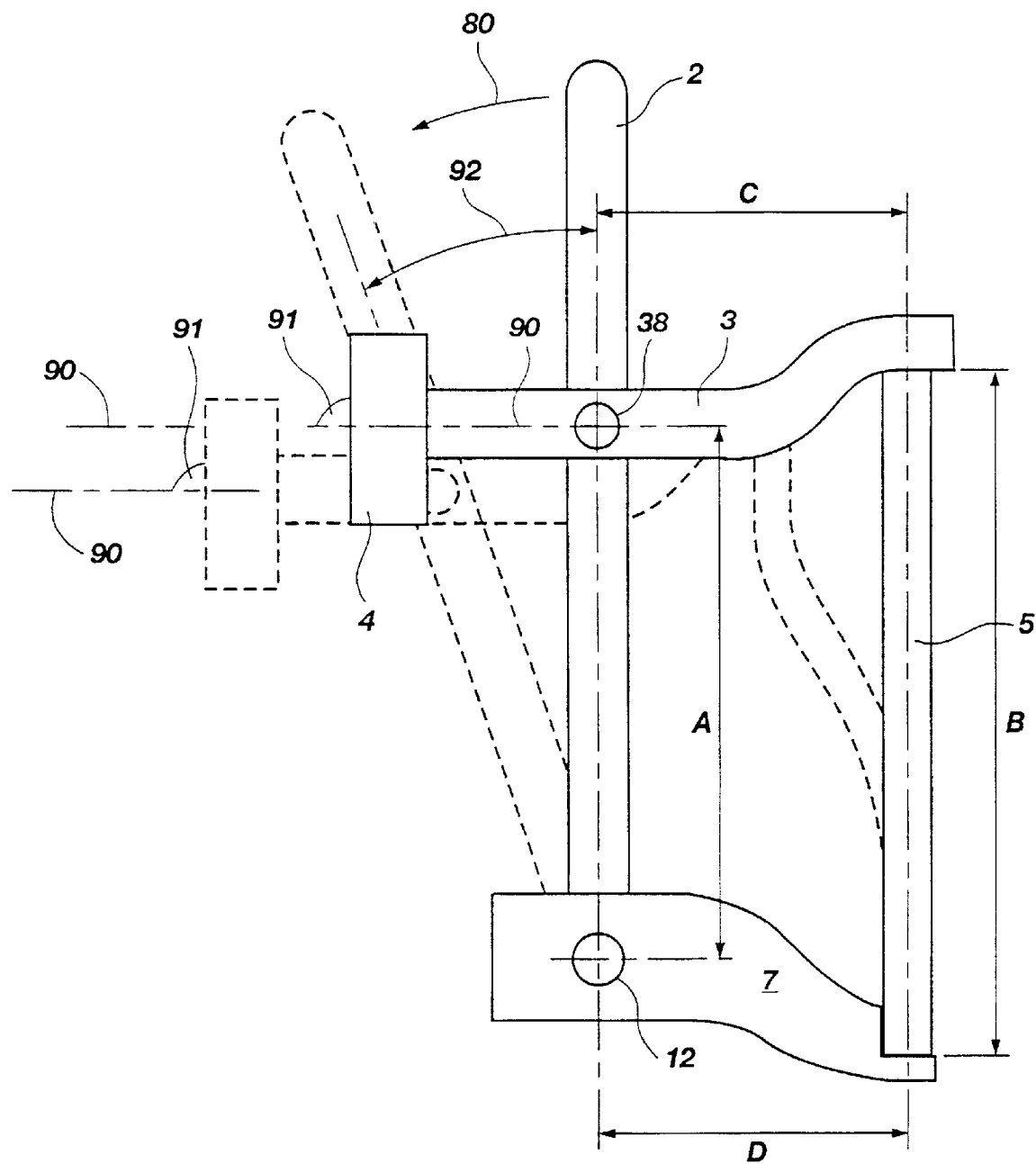
FIG. 4 is a diagrammatic view illustrating the operation of one-half of the brake device.

In operation and in reference to the previous figures and particularly to FIG. 4, when the rider operates the brake lever to pull the upper ends of the brake arms 2 toward each other by the brake cable, the brake arms 2 will be forced to rotate about the respective pivot axles 12 along an arcuate moving path 80. At this moment, frame 3 will be forced to rotate about pivot shaft 38 for a small angle 92 of movement for maintaining brake shoes 4 in the same angle 91 throughout the whole braking motion and during contact with the wheel rim. Additionally, aligning axis 90 remains relatively parallel throughout the complete braking cycle and especially when brake shoes 4 are forced to engage with wheel rim 10. The advantage is that brake shoes 4 will repeatably contact wheel rim 10 at the same optimum angle 91 from the very first use of the brake and continuing as the shoe wears out. Uniquely, angle 91 is formed between the shoe face, which will abut the wheel rim, and the aligning axis 90, which extends through the center of pivot point 38 and extends to shoe 4. When the brake lever is released by the user the brake arms 2 move back to the opened position. Specifically, brake shoes 4 are withdrawn from wheel rim 10 so that the braking action is released. Although angle 91 is illustrated as relatively perpendicular to aligning axis 90, any degree of angle is to be considered, just so angle 91 matches the wheel rim brake contact surface angle.

It is defined that pivot axis 38 is coupled to arm 2 at a mid-section. The mid-section is located at any point between the two ends of arm 2.

It is noted that aligning axis 90 is an approximation that extends through shoe 4, and frame 3. What is most important is that axis 90 will remain relatively parallel through its successive positions as arm 2 rotates, thus keeping the brake shoe 4 in a uniform position relative to the wheel rim. Additionally, it is noted that flexible member 5 will bend into a shape approximating an "S" shape during successive positions to maintain brake shoe 4 in a properly aligned position with wheel rim 10.

It is noted that member 5 is disclosed as being-fixedly mounted to the seat 7 and frame 3. Therefore, member 5 functions-as- a biasing device that also restores the whole brake mechanism, and especially brake pads 4, to the non-engaged position. One skilled in the art will realize the advantage of not having to add a spring to return the brake mechanism to its non-braking position. Namely, there will be less parts, and lower costs for making the brake mechanism.

Uniquely, there is a best mode for the four dimensions forming the four sides of the brake generally illustrated in FIG. 4 by way of the lengths labeled as "A, B, C, and D". Specifically, dimensions "C" and "D" should be relatively equal, where "C" extends from the center of pivot point 38 and to the center line of flexible member 5, and "B" extends from the center of pivot point 12 and the center line of flexible member 5. Moreover, dimension "A" should be at most equal to 0.85 of dimension "B", where "A" extends between the centers of pivots 12 and 38, and "B" extends from the, ends of flexible member. 5. Although, it is well within the abilities of a skilled artisan to vary these dimensions to a large degree, but the optimum operation will follow these relationships.

Accordingly, the brake device in accordance with the present invention includes a simplified compliant member 5 for actuating the brake shoes to hit the wheel rim flatly. Additionally, extension 34 and brake shoes 4 will move toward the wheel rim in a horizontal or non-changing angle as illustrated by center line 90 and angle 91 in FIG. 4.

It is noted that a brake shoe assembly is a combination of the brake shoe 4 and the frame 3, which is rotatably mounted to the brake arm 2.

Although the illustrated embodiment depicts brake arm 2 to be located closer to the wheel rim than flexible member 5, it is contemplated to have these two parts switched in position. Also, the pivot points 12 and 38 would be located further away from the wheel frame, since they are interacting with the brake arm 2.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed is:

1. A bicycle cantilever brake for being applied to a wheel rim of a bicycle, comprising:
   a) a seat (7) fixedly mounted to the bicycle;
   b) a brake arm (2), having a first end that is rotatably mounted to the seat;
   c) a brake shoe assembly, rotatably mounted to a mid-section of the brake arm; and
   d) a flexible member means (5), non-rotatably coupled to the seat and the brake shoe assembly, for maintaining an aligning axis (90) of the brake shoe assembly in a parallel orientation during successive stages of actuation.

2. The bicycle cantilever brake of claim 1, further comprising:
   actuation means. attached to a second end of the arm that is opposite to the first end, for actuating the brake arm and causing the brake shoe assembly-to-contact the wheel rim.

3. The bicycle cantilever brake of claim 2, wherein the actuation means comprises:
   a) a cable, attached to the second end of the brake arm; and
   b) a brake handle, attached to the bicycle so that actuation of the brake handle will actuate the cable and thereby actuate the cantilever brake.

4. The bicycle cantilever brake of claim 1, wherein the brake shoe assembly comprises:
   a) a frame (3), pivotally secured to a middle portion of the brake arm; and
   b) a brake shoe, attached to the frame, shaped and positioned to contact the wheel rim during actuation of the brake.

5. The bicycle cantilever brake of claim 1, further comprising adjusting means for adjusting the flexible member means for proper alignment of the brake shoe assembly relative to the wheel rim.

6. The bicycle cantilever brake of claim 1, wherein the brake arm is located closer to the wheel rim than the flexible member means.

7. The bicycle cantilever brake of claim 1, wherein the flexible member means retracts the brake shoe assembly from the wheel rim after the brake shoe assembly was-actuated.

8. A bicycle cantilever brake for being applied to a wheel rim of a bicycle, comprising:
   a) a seat (7) fixedly mounted to the bicycle;
   b) a brake arm (2), rotatably mounted at a first end to the seat;
   c) a brake shoe assembly, rotatably mounted to a mid-section of the brake arm; and
   d) a flexible member (5), non-rotatably coupled to the seat and the brake shoe assembly, whereby the flexible member maintains an aligning axis (90) of the brake shoe assembly in a parallel orientation during successive stages of actuation.

9. The bicycle cantilever brake of claim 8, further comprising:
   actuation device, attached to a second end of the arm that is opposite to the first end, for actuating the brake arm and causing the brake shoe assembly to contact the wheel rim.

10. The bicycle cantilever brake of claim 9, wherein the actuation device comprises:
    a) a cable, attached to the second end of the brake arm; and
    b) a brake handle, attached to the bicycle so that actuation of the brake handle will actuate the cable and thereby actuate the cantilever brake.

11. The bicycle cantilever brake of claim 8, wherein the brake shoe assembly comprises:
    a) a frame (3), pivotally secured to a middle portion of the brake arm; and
    b) a brake shoe, attached to the frame, shaped and positioned to contact the wheel rim during actuation of the brake.

12. The bicycle cantilever brake of claim 8, further comprising adjusting means for adjusting the flexible member for proper alignment of the brake shoe assembly relative to the wheel rim.

13. The bicycle cantilever brake of claim 8, wherein the brake arm is located closer to the wheel rim than the flexible member means.

14. The bicycle cantilever brake of claim 8, wherein the flexible member retracts the brake shoe assembly from the wheel rim after the brake shoe assembly was actuated.

15. A bicycle cantilever brake for being applied to a wheel rim of a bicycle, comprising:
    a) a seat (7) fixedly mounted to the bicycle;
    b) a brake arm (2), rotatably mounted at a first end to the seat;
    c) a brake shoe assembly, rotatably mounted to a mid-section of the brake arm, having a brake shoe face that will contact the wheel rim; and
    d) a flexible member means (5), non-rotatably coupled to the seat and the brake shoe assembly, for maintaining the brake shoe face at a same angle (91) during successive stages of the cantilever brake actuation cycle.

16. The bicycle cantilever brake of claim 15, further comprising:

actuation means, attached to a second end of the arm that is opposite to the first end, for actuating the brake arm and causing the brake shoe assembly to contact the wheel rim.

17. The bicycle cantilever brake of claim 16, wherein the actuation means comprises:

a) a cable, attached to the second end of the brake arm; and b) a brake handle, attached to the bicycle so that actuation of the brake handle will actuate the cable and thereby actuate the cantilever brake.

18. The bicycle cantilever brake of claim 15, wherein the brake shoe assembly comprises:

a) a frame (3), pivotally secured to a middle portion of the brake arm; and b) a brake shoe, attached to the frame, shaped and positioned to contact the wheel rim during actuation of the brake.

19. The bicycle cantilever brake of claim 15, further comprising adjusting means for adjusting the flexible member means for proper alignment of the brake shoe assembly relative to the wheel rim.

20. The bicycle cantilever brake of claim 15, wherein the brake arm is located closer to the wheel rim than the flexible member means.

21. The bicycle cantilever brake of claim 15, wherein the flexible member means retracts the brake shoe assembly from the wheel rim after the brake shoe assembly was actuated.

22. A cantilever brake apparatus for attachment to a bicycle frame comprising:

a) a first brake mechanism and a second brake mechanism, each brake mechanism including:

1) a brake arm (2) having an upper portion and a lower portion;

2) a compliant member (5) having an upper portion and a lower portion;

3) a shoe attachment member (3) configured to have a brake shoe (4) attached thereto, the shoe attachment member being pivotally coupled to the upper portion of the brake arm and non-pivotally coupled to the upper portion of the compliant member;

b) wherein the lower portion of the brake arm (1) is pivotally coupled to the bicycle frame so that the lower portion of the brake arm pivots when a braking force is applied by the cantilever brake apparatus to cause the brake shoe (4) to move toward a wheel rim;

c) a seat (7) attached to the bicycle frame, including an attitude maintenance means (78) for selectively maintaining an attachment attitude of the seat relative to the bicycle frame;

d) wherein the lower portion of the compliant member (5) is non-pivotally coupled to the seat (7) at an attitude selected by the attitude maintenance means; and e) wherein the lower portion of the brake arm and the lower portion of the compliant member (5) are spaced apart from each other for forming a four member mechanism comprising the shoe attachment member (3), the brake arm (2), the seat (7), and the compliant member (5).

* * * * *

UNITED STATES PATENT AND TRADEMARK OFFICE
CERTIFICATE OF CORRECTION

| | |
|---|---|
| PATENT NO. | : 6,454,055 B1 |
| APPLICATION NO. | : 09/763818 |
| DATED | : September 24, 2002 |
| INVENTOR(S) | : Todd Coons et al. |

It is certified that error appears in the above-identified patent and that said Letters Patent is hereby corrected as shown below:

Column 1; line 7 Add:

GOVERNMENT RIGHTS

This invention was made with government support under Grant No. DMI 9624574 awarded by National Science Foundation. The government has certain rights in the invention.

Signed and Sealed this

Sixth Day of January, 2009

JON W. DUDAS
*Director of the United States Patent and Trademark Office*